United States Patent
Wu et al.

(10) Patent No.: US 10,670,408 B2
(45) Date of Patent: Jun. 2, 2020

(54) SYSTEM FOR SENSING INTERIOR SPACES TO AUTO-GENERATE A NAVIGATIONAL MAP

(71) Applicant: Innerspace Technology Inc., Newmarket (CA)

(72) Inventors: James Wu, Newmarket (CA); Jason Gamblen, Newmarket (CA); Matt MacGillivray, Newmarket (CA)

(73) Assignee: INNERSPACE TECHNOLOGY INC., Newmarket, Ontario (CA)

( * ) Notice: Subject to any disclaimer, the term of this patent is extended or adjusted under 35 U.S.C. 154(b) by 201 days.

(21) Appl. No.: 15/607,057

(22) Filed: May 26, 2017

(65) Prior Publication Data

US 2017/0261594 A1    Sep. 14, 2017

Related U.S. Application Data

(63) Continuation of application No. PCT/CA2015/051343, filed on Dec. 17, 2015.

(51) Int. Cl.
*G01C 21/20* (2006.01)
*G01C 23/00* (2006.01)
(Continued)

(52) U.S. Cl.
CPC .......... *G01C 21/206* (2013.01); *G01C 23/00* (2013.01); *G01S 7/003* (2013.01); *G01S 17/89* (2013.01); *G06F 16/29* (2019.01); *G06T 17/05* (2013.01); *G01C 21/34* (2013.01); *G01S 5/14* (2013.01)

(58) Field of Classification Search
CPC ........ G01C 21/206; G01C 23/00; G01S 17/89
See application file for complete search history.

(56) References Cited

U.S. PATENT DOCUMENTS

2003/0080901 A1  5/2003  Piotrowski
2007/0143006 A1  6/2007  Plettner
(Continued)

FOREIGN PATENT DOCUMENTS

EP    1705459 A2    9/2006
WO    2011/144966    11/2011
(Continued)

OTHER PUBLICATIONS

International Search Report and Written Opinion of PCT/CA2015/051343.
(Continued)

*Primary Examiner* — Basil T. Jos
(74) *Attorney, Agent, or Firm* — Aird & McBurney LP

(57) ABSTRACT

A transponder for sensing a spatial environment for the purposes of creating a local map model of said spatial environment, said transponder comprising: a microprocessor; at least one sensor for scanning said spatial environment and acquiring sensing information about said spatial environment; a memory having instructions executable by said microprocessor to cause the microprocessor to process said sensing information to: determine distance measurements between said transponder and features within said spatial environment; and generate said local map model; a communications interface module coupled to said microprocessor for enabling communication with a first computing device to send said local map model thereto and for enabling communication with a second computing device for using said local map model to navigate said spatial environment.

31 Claims, 11 Drawing Sheets

(51) Int. Cl.
*G01S 17/89* (2020.01)
*G06F 16/29* (2019.01)
*G01S 7/00* (2006.01)
*G06T 17/05* (2011.01)
G01S 5/14 (2006.01)
G01C 21/34 (2006.01)

(56) References Cited

U.S. PATENT DOCUMENTS

2008/0198072 A1* 8/2008 Elwell .................. G01C 21/206
 342/450
2008/0303717 A1* 12/2008 Durban .................... G01S 1/44
 342/371
2014/0278060 A1* 9/2014 Kordari ................ G01C 21/206
 701/422

FOREIGN PATENT DOCUMENTS

WO 2014/159713 10/2014
WO 2014172792 10/2014

OTHER PUBLICATIONS

Birk A. et al., "Merging Occupancy Grid Maps from Multiple Robots", Proceedings of the IEEE, IEEE. New York, US, vol. 94, No. 7, Jul. 1, 2006, pp. 1384-1397.
Extended European Search Report for EP15868792.1 dated Jul. 24, 2018.

* cited by examiner

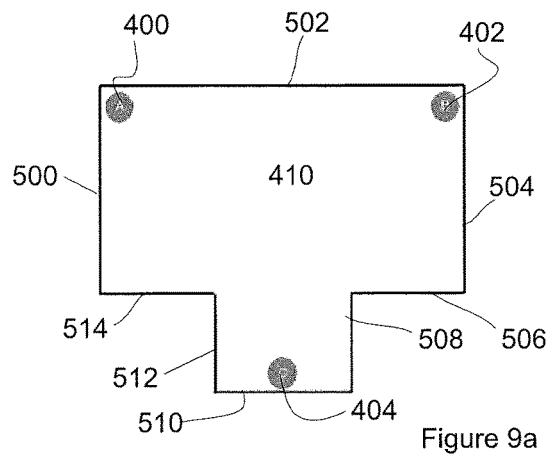
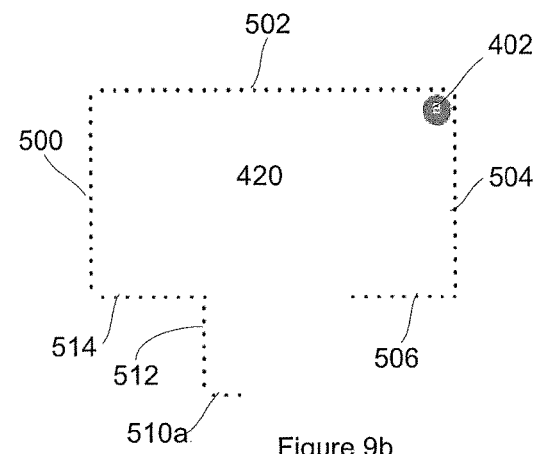
Figure 9a
Figure 9b
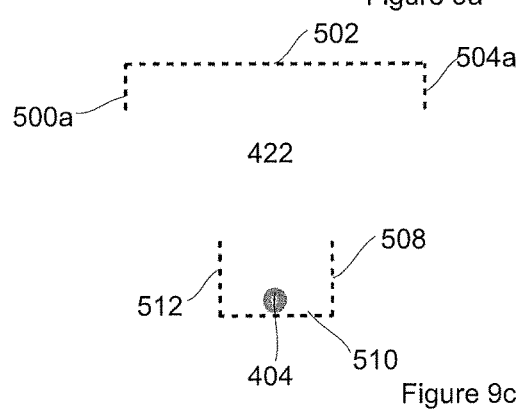
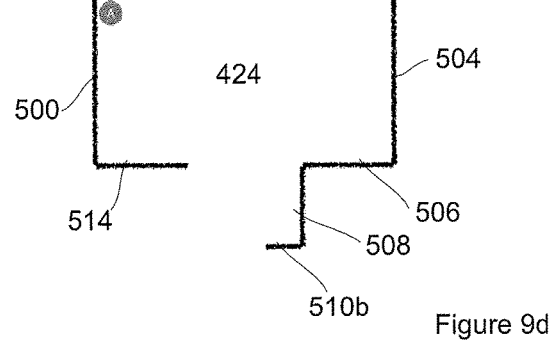
Figure 9c
Figure 9d
Figure 10a
Figure 10b
Figure 10c
Figure 10d Best match amongst all components is selected as the final, composed map.

SYSTEM FOR SENSING INTERIOR SPACES TO AUTO-GENERATE A NAVIGATIONAL MAP

CROSS-REFERENCE TO RELATED APPLICATIONS

This application is a continuation of International Patent Application No. PCT/CA2015/051343, filed on Dec. 17, 2015, which claims the benefit of priority to U.S. Provisional Application Ser. No. 62/093,837, filed on Dec. 28, 2014.

FIELD OF THE INVENTION

The present invention relates to mapping, more particularly it relates to methods and systems for sensing an interior space to automatically generate a map to facilitate navigation thereof.

DESCRIPTION OF THE RELATED ART

Mapping of interior spaces is gaining in popularity as there is a need to easily navigate large buildings, such as hospitals, government buildings, malls, convention centers, libraries, universities, stadiums, airports, and so forth. Navigational maps are often created manually using floor plan images, and these maps are used with portable devices to provide navigational tools which determine the user's position within a given space.

Some navigational tools are also able to provide turn-by-turn indoor navigation, however, such tools rely heavily on manual work to assemble the requisite map and directions, resulting in a cumbersome and time-consuming process. Generally, in order to provide turn-by-turn navigation, an interior positioning system needs the ability to locate a client device, such as a handheld device, within a space and to map that location to a representation of the space that embodies a true understanding of its physical characteristics, barriers, structures, such as walls, passageways stairs etc. Any such representation is considered to be a 'routable' map of the floor plan, as it embodies the necessary information to plot a route through the space, in contrast to simple image of a floor plan. If the indoor positioning system has no knowledge of the physical characteristics, barriers, structures, then the onus is on the user to understand the markings on the map, and determine markings that represent physical barriers or structures. Therefore, the user is forced to self-navigate around those barriers or structures based on an understanding of his/her relative position on that map, which can be challenging for visually impaired individuals.

At present, there exists several approaches for providing turn-by-turn navigation in indoor spaces such as proximity-based, triangulation and/or trilateration, ambient signal fingerprinting, and motion based solutions. Proximity based technologies, such as iBeacon™, from Apple Inc., Cupertino, Calif., U.S.A., and radio-frequency identification (RFID) provide turn-by-turn navigation by detecting the proximity and range of a handheld user device, such a smartphone, to beacons, or RFID tags, deployed meticulously within a building to be navigated. Accordingly, in order to achieve the positioning accuracy required for turn-by-turn navigation within typical buildings, the deployment would necessitate a relatively high density of beacons/tags, which would be impractical and relatively expensive. In addition, proximity-based technologies are fundamentally unaware of the surrounding space, that is, walls, passageways or openings of a building, or other objects or obstacles.

Wi-Fi® triangulation and/or trilateration are other popular technologies for enabling indoor navigation. Wi-Fi is a registered trademark of the Wi-Fi Alliance. These triangulation and/or trilateration techniques calculate a relative position of a receiver, such as a handheld user device, based on the signal strength of the radio signals from Wi-Fi routers installed in buildings. Similar to iBeacon, if the specific locations of the routers are known, and have been mapped against the space, then a client application on the user device can triangulate and/or trilaterate those signals and determine the user device's location relative to the routers. However, while Wi-Fi triangulation and/or trilateration can calculate the user device's position with an accuracy of within a few feet, this approach relies on existing infrastructure, that is, by leveraging Wi-Fi routers that already exist to support network access within a building. As such, since existing infrastructures are typically designed to provide network coverage of a building, there is usually only one access point (AP), while position triangulation and/or trilateration require access to at least three APs. Therefore, most areas of a building would lack sufficient coverage to support navigation, and additional deployment of routers would be required to enable navigation. Furthermore, unpredictable signal reflection and attenuation inside buildings introduces distance measurement errors, thereby severely impacting the accuracy of the positioning information, thus rendering turn-by-navigation directions non-reliable. Additionally, most companies or organizations are reluctant to increase network traffic and latency on their Wi-Fi networks, or allow access to Wi-Fi networks carrying sensitive data.

With both iBeacon and RFID-based approaches, current triangulation and/or trilateration systems are dependent on the availability of a routable map of the floor plan to provide turn-by-turn directions. Such maps are generally created via a manual scanning or a mapping process performed by a user or a system installer, as will be described in greater detail below. This process may include walking the perimeter of every room and hallway of a building, or may involve onsite visits from a paid consultant to scan and map the space. As such, each time the configuration or layout of the space changes, due to renovations or temporary closures, the scanning/mapping process must be repeated.

Yet another approach encompasses a variety of techniques that employ similar strategies to reliably identify unique locations within a space. These strategies typically leverage the availability of a wide variety of ambient signals that are a natural characteristic of, or artificially deployable into, indoor locations. The goal is to employ sensors that can recognize minute differences in environmental conditions (natural or artificial) as defined by these signals to create a baseline for these conditions throughout an interior space. This baseline creates a fingerprint for that signal that is uniquely associated with a location within the space. For example, one approach recognizes that electromagnetic signatures are influenced by building structure and contents, and are actually unique to specific areas within an indoor space. Analyzing and recognizing these signatures provides a means of positioning. Similarly, air pressure changes can be leveraged as a measure of altitude and used to distinguish between floors of multi-story buildings. In addition to naturally ambient signals, the indoor space may be artificially instrumented with additional signals. The most common of such signals would be the Wi-Fi radio signals produced by network routers. By sampling the signal conditions over time, a signal fingerprint can be established that is characteristic of the specific location in which the sample is taken. When the fingerprint is recognized, location can be assumed.

However, other artificial signals can be deployed, such as non-visible light pulses or ultra/sub-sonic sounds, that can be used to create unique fingerprints for specific locations within an indoor space. These artificial signals can be defined to indicate specific areas of an indoor space, as is the case with existing implementations that employ non-visible light pulses from LED lighting, or create location specific fingerprints similar to what was described above, as is the case with existing implementations that employ ultra/sub-sonic sound. Again, as with both proximity-based and tri-angulation and/or trilateration technologies, signal fingerprinting based systems require routable maps of the floor plan, which must be created using one of the approaches described below.

Yet another approach encompasses strategies for calculating changes in position from a known position by tracking localized motion of the user within the space. Information about the motion of the user can be used to infer changes in position. For example, the accelerometer in a smartphone can report changes in acceleration, both direction and force, which can be used to infer the magnitude of a change in position. Similarly, image based approaches use smartphone cameras and image processing to infer changes in direction by calculating the relative changes in pixels in the image. Again, as with all other technologies mentioned, motion based approaches require routable maps of the floor plan, which must be created using one of the approaches described below.

Routable maps of indoor spaces may be based on site walks, manual image tracing, image recognition and crowdsourcing. Site walks are a common approach to mapping indoor spaces for the purposes of creating 'routable' maps to enable turn-by-turn navigation. Site walks involve considerable manual effort, requiring a user (or paid consultant) to physically walk the entire indoor space while holding a purpose-built device (or smartphone and app) in order to define every walkable space in the building, such as each room and hallway, as well as in aisles in larger, open spaces. The device records the position of the user performing the site walk using the indoor positioning system (IPS) technology being installed in the space (see above) in order to map out the physical characteristics of the building. Once the spaces have been mapped, a manual process of identifying the spaces (i.e. name the retailers, identify bathrooms, etc.) must be manually performed.

Another common approach to creating 'routable' maps, notably used by Google Indoor Maps amongst others, is manual mapping. The process involves the annotation of an existing non-routable map (an image of the floor plan). The annotations define the walls, passageways, staircases and any other relevant details of the space in order to create a routable version of the map. The annotation is a manual process—an employee of the service provider or the customer themselves, manually analyses the map and manually inputs the required information. As such, this process can be time consuming and error prone. Once the routable map is created, it is aligned with the positioning information available from whichever positioning technology is being deployed in the space.

Yet another approach to enable turn-by-turn navigation is based on image recognition. One solution requires the availability of an image of a floor plan for a space (a non-routable map), and the image is uploaded to a service provider, where complex image processing algorithms are applied. These algorithms attempt to identify specific physical characteristics described on the floor plan, such open spaces, rooms, hallways, elevators, stairways etc. The goal of this analysis is to create spatial connectivity graphs that can be used to identify routes through the map for the purpose of enabling turn-by-turn navigation. As with other approaches, once the routable map is created through this process, it must be aligned with the positioning information available from whichever positioning technology is being deployed in the space.

Another solution is based on image recognition, and involves analysis of photographs of the interior of the space to be mapped. A process of recording photographs of every physically relevant element (e.g. walls, doorways, etc.) within the space is undertaken. Image recognition algorithms are employed to identify co-located imagery (i.e. photos of adjacent walls) as well as infer relative sizing. This information is used to piece together a composite map of the floor plan. However, this process involves significant post processing human involvement for purposes of correction and adjustment. Again, as with other technologies, once the routable map is created through this process, it must be aligned with the positioning information available from whichever positioning technology is being deployed in the space.

Yet another approach employs crowdsourcing to define a space, in which images of interior spaces are collected, analyzed and assembled into a cohesive map. Another approach relies on the common movements of users of the space, and tracks those movements using whichever positioning technology is being deployed in the space. Over time, the common movements define patterns of movement within the space, which can be inferred to define relevant spatial connectivity and identify navigable routes through the space for the purpose of enabling turn-by-turn navigation. The above-noted approaches result in maps that are a snapshot of the floor plan, and therefore each instance there is a change to the floor plan or space, the mapping process must be performed in order to capture the changes and update the map accordingly.

It is an object of the present invention to mitigate or obviate at least one of the above-mentioned disadvantages.

SUMMARY OF THE INVENTION

In one of its aspects, there is provided a transponder for sensing a spatial environment for the purposes of creating a local map model of said spatial environment, said transponder comprising:
    a microprocessor;
    at least one sensor for scanning said spatial environment and acquiring sensing information about said spatial environment;
    a memory having instructions executable by said microprocessor to cause the microprocessor to process said sensing information to:
        determine distance measurements between said transponder and features within said spatial environment; and
        generate said local map model;
    a communications interface module coupled to said microprocessor for enabling communication with a first computing device to send said local map model thereto and for enabling communication with a second computing device for using said local map model to navigate said spatial environment.

In another of its aspects, there is provided, in a spatial environment, a method for determining a relative position of at least one transponder, the method comprising the steps of:

positioning a first transponder in a first location within said spatial environment; positioning a second transponder in a second location within said spatial environment; positioning a third transponder in a third location within said spatial environment, wherein each of said transponders comprises at least one sensor;

causing each of said first transponder, said second transponder, and said third transponder to scan said spatial environment and with said at least one sensor to measure distances within said spatial environment relative to each of said locations and determine orientation of said transponder within said spatial environment and each of said first transponder, said second transponder, and said third transponder composing a corresponding first local map model, second local map model and a third local map model of said spatial environment;

each of said first transponder, said second transponder, and said third transponder transmitting said first local map model, second local map model and a third local map model of said spatial environment to said first computing device;

at said first computing device, overlaying and aligning said first local map model, second local map model and a third local map model of said spatial environment to form a composite map model of said spatial environment; and calculating said relative position of each of said first transponder, said second transponder, and said third transponder based on distance measurements from each of said transponders.

In another of its aspects, there is provided, in a spatial environment, in a spatial environment, a method for determining a relative position of at least one transponder of a set of transponders positioned in different locations within a spatial environment, the method comprising the steps of:

positioning a first transponder in a first location; positioning a second transponder in a second location; positioning a third transponder in a third location, wherein each of said transponders comprises at least one sensor;

causing said first transponder to scan said spatial environment and with said at least one sensor to measure distances within said spatial environment relative to said first location and composing a corresponding first local map model; causing said second transponder to scan said spatial environment and with said at least one sensor to measure distances within said spatial environment relative to said second location and composing a corresponding second local map model; causing said third transponder to scan said spatial environment and with said at least one sensor to measure distances within said spatial environment relative to said third location and composing a corresponding third local map model; and wherein at least two of said transponders scan at least one common feature, and each of said first transponder, said second transponder, and said third transponder transmitting said first local map model, second local map model and a third local map model to said first computing device;

at said first computing device, overlaying a first pair of said first local map model and said second local map model in different positions and orientations to iteratively match common features between said first pair, and determining a best match between said first local map model and said second local map model according to a predetermined match criteria; and when said best match is determined, generating a first composite map model comprising said first local map model and said second local map model; and overlaying a second pair of said first local map model and said third local map model in different positions and orientations to iteratively match said at least one common feature between said second pair, and determining a best match between said first local map model and said third local map model according to a predetermined match criteria; and when said best match is determined, generating a second composite map model comprising said first local map model and said third local map model; and overlaying a third pair of said second local map model and said third local map model in different positions and orientations to iteratively match said at least one common feature between said third pair, and determining a best match between said second local map model and said third local map model according to a predetermined match criteria; and when said best match is determined, generating a third composite map model comprising said first local map model and said third local map model;

generating a single composite map model comprising said first composite map model, said second composite map model and third composite map model; and calculating said relative position of each of said first transponder, said second transponder, and said third transponder based on distance measurements from each of said transponders.

In another of its aspects, there is provided a method for generating a routable map of a spatial environment, the method comprising the steps of:

positioning a transponder in a location within said spatial environment;

associating at least one sensor with said transponder, said at least one sensor being rotatable in at least one plane;

measuring distances within said spatial environment with said at least one sensor relative to said location; and composing a local map model of spatial environment based on said measurements.

In another of its aspects, there is provided a wayfinding system comprising:

a first device comprising at least one sensor for sensing a spatial environment to generate a first map, said a first device positioned in a first position in said spatial environment;

a second device for receiving signals from said first device to determine a relative position of said second device within said spatial environment; and wherein on said second device said relative position is used in conjunction with said first map to provide turn-by-turn navigation within said spatial environment.

Advantageously, the mapping procedure and routable map generation is dynamic and automated, resulting in substantially less manual work, which results in easier and faster deployment than current methods. The system is capable of detecting any changes made to any part of the floor plan, space, or device deployment, and such changes are registered for seamless, automatic updates of the floor plan and routable map, without any user intervention. The system is capable of real-time mapping, as the transponders can automatically respond to changes in their location due to renovations, temporary deployments of objects or structures, or relocations. For example, floor plans for dynamically configured interior spaces such as retail stores can be easily kept up-to-date.

Additionally, by integrating the mapping sensors and the radios used to provide location information into the same physical device, the transponder automatically solves a problem that all other systems must rely on manual intervention to address. In other systems, in order to accurately triangulate/trilaterate a position on a map based on radio signals, the exact location of the source of those signals must be known. Prior art indoor location systems that do not have an innate relationship between the maps and signal sources must establish and maintain this relationship manually, and such prior art systems are more susceptible to inaccuracy due to errors in the assumed location of the signal sources relative to the map. In contrast, with this system the exact location of the radio signal sources i.e. the transponders can be determined, even if the transponders are moved to new locations within the space, because the source of the signal can be co-located with the transponder's spatial sensors. Each transponder is aware of its own position relative to the surrounding physical structures on the maps they create, since the maps are created based on the measurements made by spatial sensor to the surrounding physical structures.

BRIEF DESCRIPTION OF THE DRAWINGS

Several exemplary embodiments of the present invention will now be described, by way of example only, with reference to the appended drawings in which:

FIG. 9a shows the location of transponders in a spatial environment;

FIGS. 9b to 9d show local map model corresponding to the transponders of FIG. 9a;

FIGS. 10a to 10d show the pairing of the local map models to determine the best match to generate a working composite map model.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
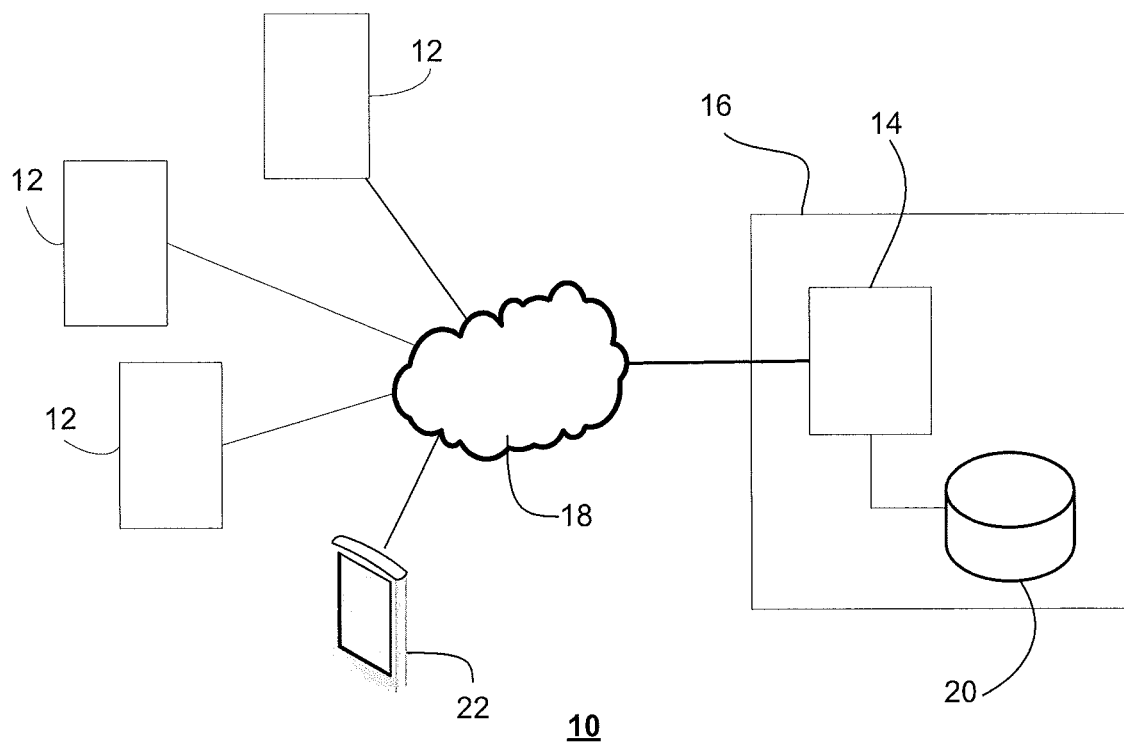
FIG. 1 is a top-level component architecture diagram of an exemplary mapping system.

FIG. 1 shows a top-level component architecture diagram of an exemplary system, generally identified by reference numeral 10, for enabling turn-by-turn navigation in a spatial environment. System 10 generally includes a plurality of transponders 12 positioned at different locations within the spatial environment, such as a room or building. Each transponder 12 is configured to sense its environs by measuring relative distances to objects and/or structures in order to generate a local map model, as will be described in more detail below.

The generated local map model is transmitted to a computing system 14 of a central management unit 16 via communications network 18, such as the Internet, and/or any other suitable network. Examples of computing system 14 may include, but are not limited to: a personal computer, a server computer, a series of server computers, a mini computer, and a mainframe computer. For example, server computer 14 comprises one or more databases 20, which may be any type of data repository or combination of data repositories, which store records or other representations of data. Accordingly, generated maps are stored on databases 20 and accessible to user devices 22 via server computer 14.

Figure 2A:
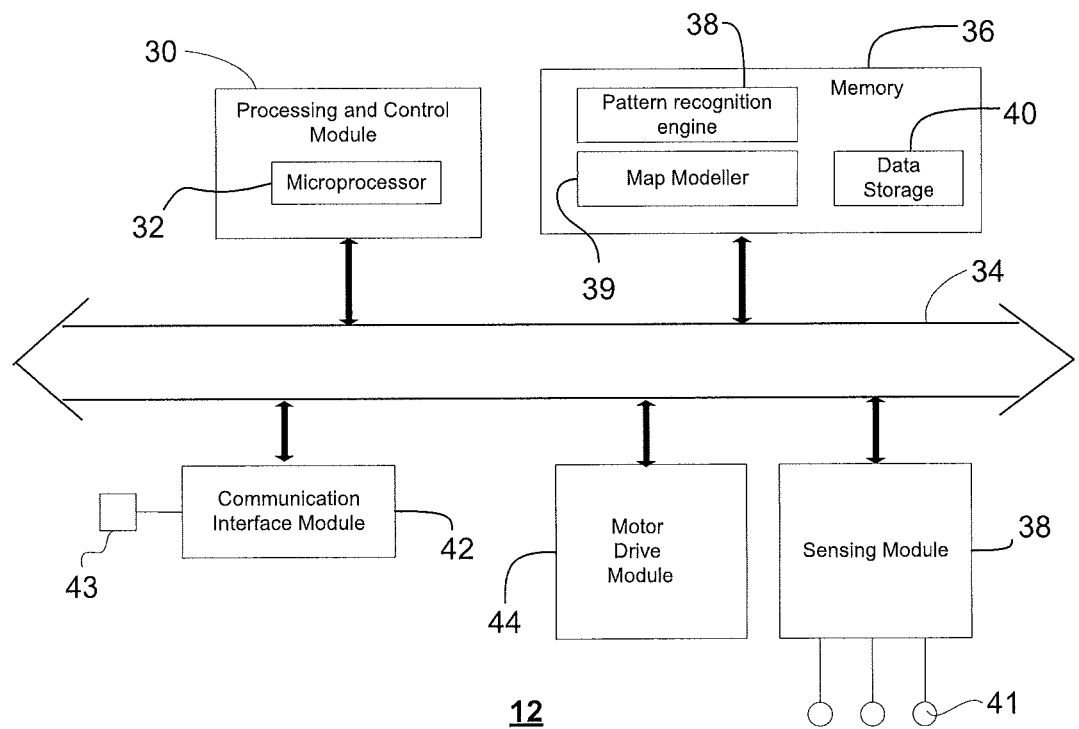
FIG. 2a shows a schematic diagram of a transponder.
Figure 2B:
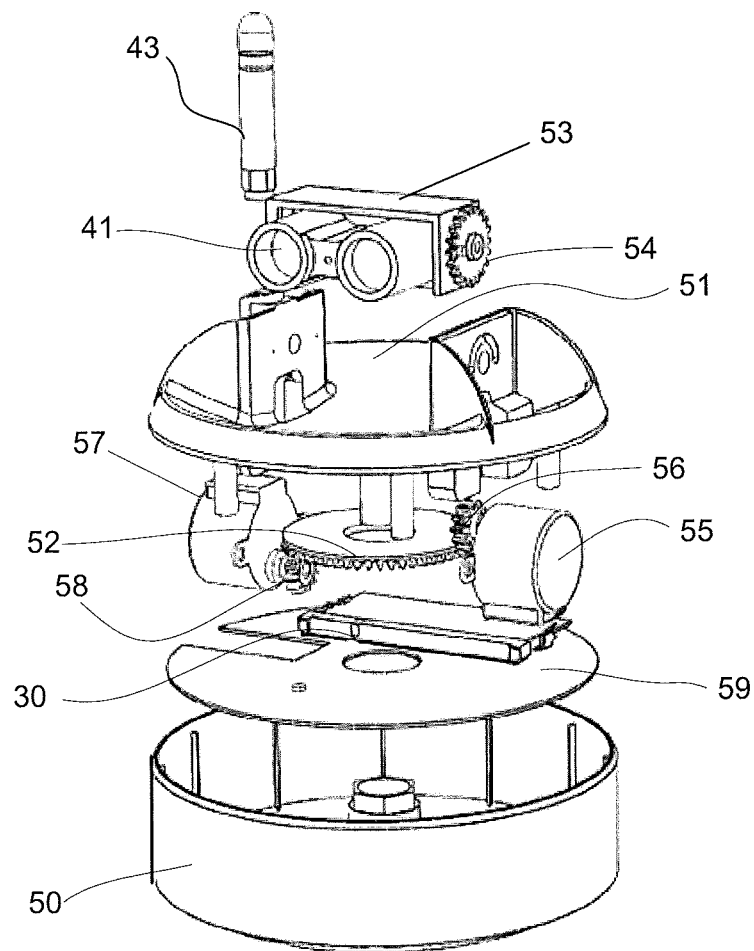
FIG. 2b shows an exploded view of a transponder.
Figure 2C:
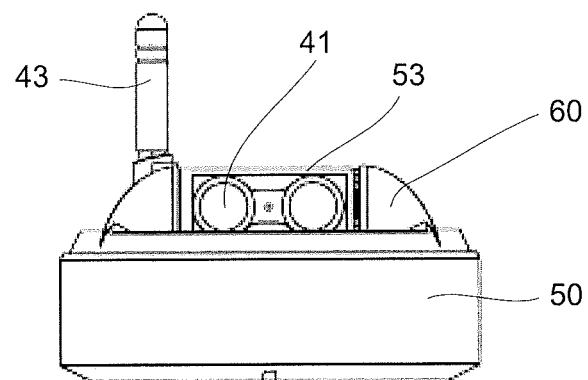
FIG. 2c shows a perspective view of the transponder.
Figure 2D:
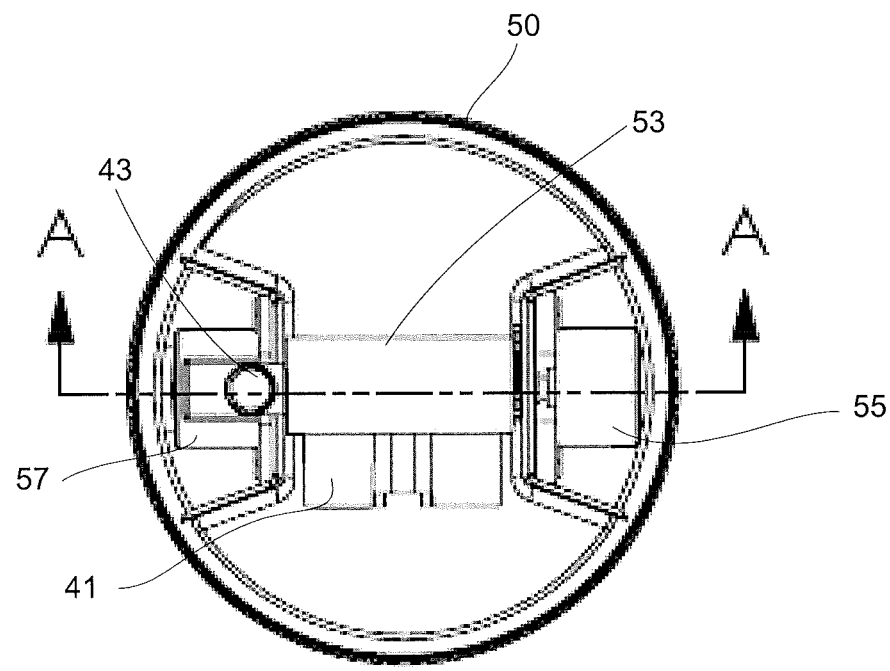
FIG. 2d shows a top view of the transponder.
Figure 2E:
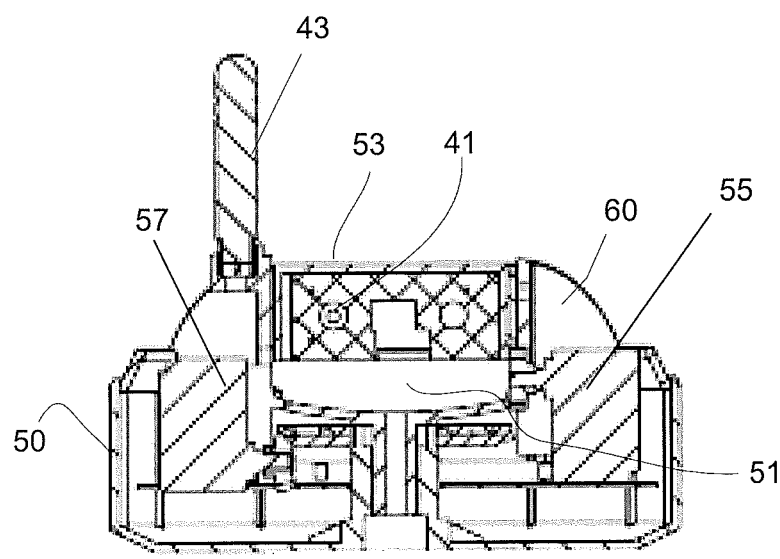
FIG. 2e shows a sectional view of the transponder of FIG. 2c along line A-A.

Now turning to FIG. 2a, there is shown a schematic diagram of an exemplary transponder 12, comprising processing and control module 30 having processing circuitry, such as, microprocessor 32, which is arranged to communicate, via system bus 34, with memory 36 and sensing module 37. The skilled person will appreciate that memory 36 may be provided by a variety of components including a volatile memory, a hard drive, a non-volatile memory, etc. Indeed, memory 36 comprise a plurality of components under the control of the, or otherwise connected to, the processor 32. However, typically memory 36 provides a program storage portion arranged to store program code which when executed performs an action, such as pattern recognition engine 38, map modeller 39, and a data storage portion 40 which can be used to store data either temporarily and/or permanently. Sensing module 37 receives sensory input signals from a sensor, a plurality of sensors, or sensor array 41, which are converted to sensory data via signal processing means and stored in data storage portion 40 accessible to processing and control module 30. Generally, sensors 41 scan the physical space surrounding each individual transponder 12 by measuring distances, and pattern recognition engine 38 comprises executable instructions that perform a pattern recognition process to recognize common physical attributes within said spatial environment, such as objects and physical landmarks, such as, walls, doorways, etc.

Transponder 12 also includes communications interface module 42 with a transceiver for emitting radio signals to user device 22 and other transponders 12 to determine a relative position of user device 22 in the spatial environment, and for receiving radio signals from other transponders 12, as will be described in more detail below. Communications interface module 42 may include a wired interface, wireless interface, optical, IR interface or RF interface, and may use standard protocols such as SONET, SDH, Zigbee, Ethernet, Wi-Fi (e.g. IEEE 802.11a/b/g/n, WiMax), Bluetooth, powerline communication (e.g. IEEE 1901), or other standard and non-standard physical layers well known to those skilled in the art. Antenna 43 is electrically connected to the transceiver. In addition, communications interface module 42 enables connection to shared or remote drives, one or more networked computers 14, or other networked devices, via communications network 18 Communications interface module 42 also allows transponder 12 to be monitored by server computer 14 for maintenance purposes. Accordingly, each transponder 12 includes a unique identifier, such as a media access control (MAC) address, which is discovered or registered with server computer 14.

Sensors 41 are mounted on a movable platform which allows sensors 41 to be positioned and repositioned to capture distance information relative to the transponder 12 in a spatial environment having other objects or structures. The base includes motors controlled by a motor drive module 44, which receives control commands from processing and control module 30. Sensors 41 may operate based on a sensing technology, such as, sonar, laser, IR, radar and lidar, radio frequency (RF) or a combination thereof, to measure distances. Any other sensing technology capable of measuring discrete distances may be suitable, and different sensing technologies may be employed as appropriate to suit particular situations and use cases, and the choice may depend on the cost of the transponder, room size, accuracy requirements, and so forth. For example, laser and infrared sensors determine distance on the basis of time of flight of light, while lidar measures distance by measuring the minute time differences between the transmission and reception of single-band laser signals that are beamed at an object. These signals are then digitally processed and analyzed to produce time delay data that is used to calculate the distance and generate a local map model of the sensed environment.

In one exemplary embodiment, each transponder 12 is deployed into existing spaces without the need for additional electrical or data connections, and without any imposition in existing network infrastructure. Typically, transponder 12 is powered via existing AC mains, and may be connected to a standard AC wall socket, standard light socket, or emergency lighting installation.

As shown in FIGS. 2b, 2c, 2d and 2e, transponder 12 comprises base 50 to be attached to a ceiling, a wall or the like, and a chassis or platform 51 rotatably attached to base 50 having a pan bevel gear 52 associated therewith. Sensors 41 are mounted on a sensor cradle 53 rotatably mountable on platform 51, and secured to sensor cradle 53 is tilt bevel gear 54. Also mounted on platform 51 is tilt motor 55 which turns tilt motor bevel gear 56 with teeth that interlock with teeth of tilt bevel gear 54 to rotate sensor cradle 53 and sensors 41 through a range of motion. Platform 51 is panned through a range of motion by pan motor 57 which turns pan motor bevel gear 58 with teeth that interlock with teeth of pan bevel gear 52. Motor drive module 44 allows pan and tilt motors 55 and 57 to preferably employ low cost stepper motors. Motor drive module 44 performs linearization of the motor drive signals so that small micro-steps can be made. The linearized micro-steps provide a smooth panning or tilting of platform 51, and hence sensors 41, at slow speeds and in both elevations and azimuth directions. The linearization requires different commands for moving in one direction than the other. Printed circuit board 59 including processing and control module 30, memory 36, sensing module 37, motor drive module 44, bus 34 and communication interface module 42 is housed inside base 50. Antenna 43 is coupled to communication interface module 42 on printed circuit board 59. Cover 60 is secured to platform 51 to enclose the various components of transponder 12.

User device 22 may be in the form of any kind of general processing structure, and may for example include any device, such as, a personal computer, laptop, computer server, handheld user device (e.g. personal digital assistant (PDA), mobile phone, tablet, smartphone).

Figure 3:
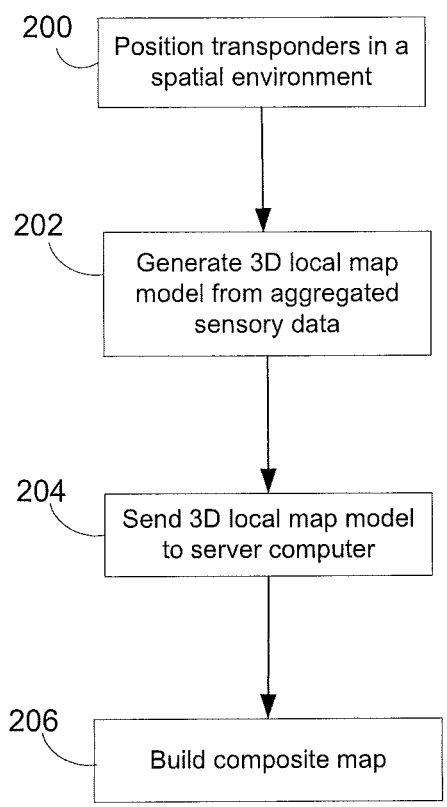
FIG. 3 shows a high level flow diagram illustrating an exemplary process steps for sensing and mapping a spatial environment.
Figure 4A:
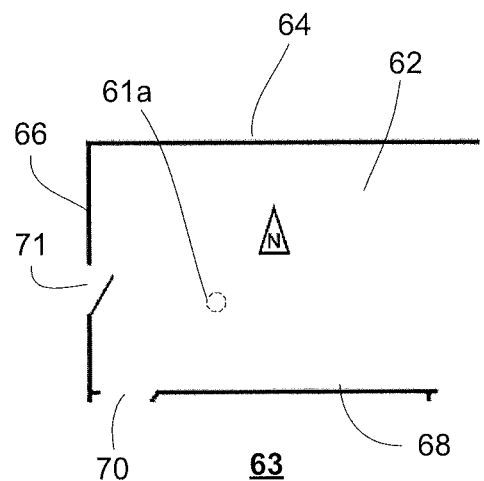
FIGS. 4a, 4b, 4c and 4d show a local map model generated by individual transponders.

Referring now to FIG. 3, there is shown a high level flow diagram illustrating exemplary process steps for generating a composite map corresponding to a chosen spatial environment. In step 200, a set of transponders 61a, 61b, 61c, 61d are positioned in known locations within a spatial environment, such as a building floor with a plurality of rooms, as shown in FIG. 4. For example, transponder 61a senses space 62 by rotating the movable platform 51 360° in a single plane or in multiple translational planes (x, y, z) to determine relative distances. Accordingly, at each degree (or fraction thereof) of rotation around each plane, a distance measurement is recorded. In step 202, sensors 41 of transponder 61a yield a range sensor data set, and using instructions of map modeller 39 executable by processing and control module 30, a 3D local map model corresponding to a portion of space 62 in the field of view of sensors 41 is generated. FIG. 4a shows a 2D local map model 63 comprising grid points computed from the measurements which define walls 64, 66 and 68, and openings 70, 71. A 3D local map model is also generated based on other spatial or elevation measurements. The modelling process may be a client-side process stored on one or more storage devices coupled to one or more transponder. In such an implementation, processing and control module 30 may include a stand-alone application or an applet/application that is executed within a client application.

Figure 4B:
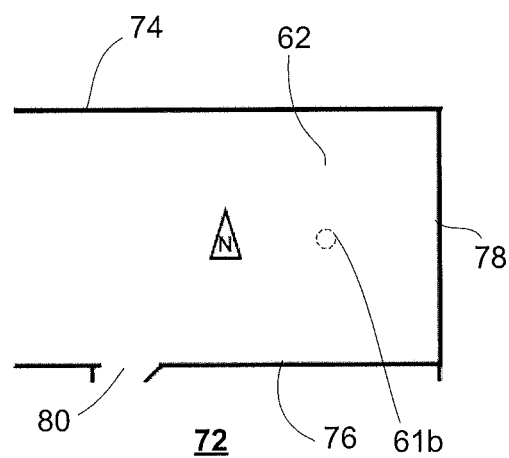
Figure 4C:
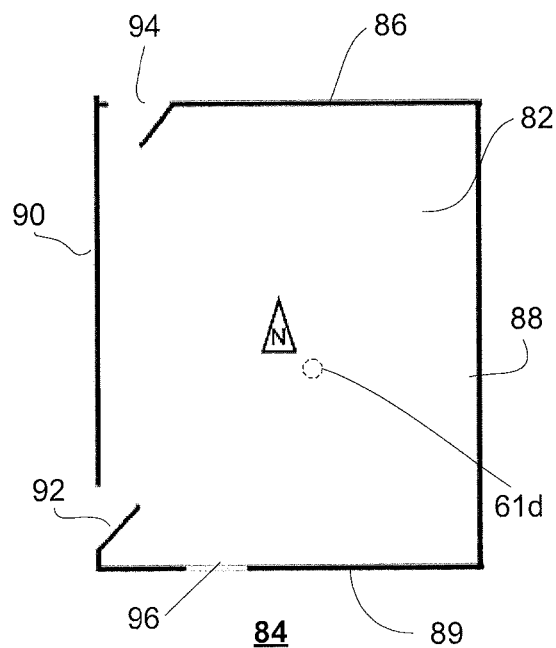
Figure 4D:
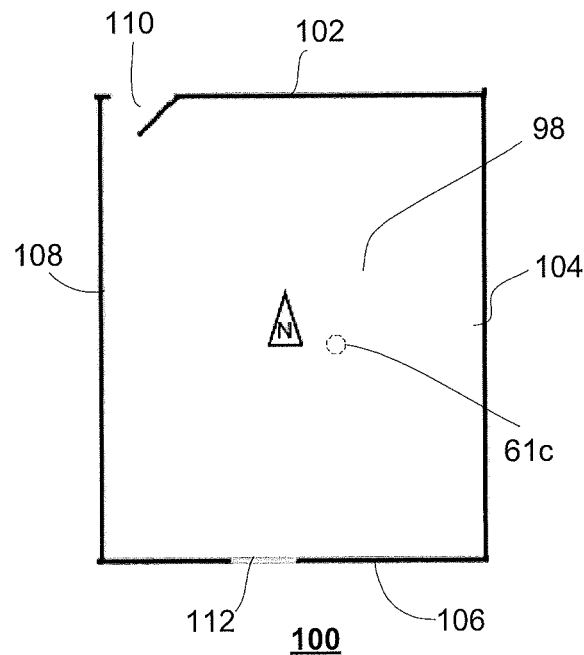

Similarly, sensors 41 of transponder 61b yield a range sensor data set and using instructions of map modeller 39 executable by processing and control module 30, a 3D local map model corresponding to a portion of space 62 in the field of view of sensors 41 is generated. FIG. 4b shows a 2D local map model 72 comprising grid points computed from the measurements which define walls 74, 76 and 78, and opening 80. Sensors 41 of transponder 61c yield a range sensor data set, and using instructions of map modeller 39 executable by processing and control module 30, a 3D local map model corresponding to space 82 in the field of view of sensors 41 is generated. FIG. 4c shows a 2D local map model 84 comprising grid points computed from the measurements which define walls 86, 88, 89 and 90, openings 92, 94 and window 96. Sensors 41 of transponder 61d yield a range sensor data set, and using instructions of map modeller 39 executable by processing and control module 30, a 3D local map model corresponding to space 98 in the field of view of sensors 41 is generated. FIG. 4*d* shows a 2D local map model 100 comprising grid points computed from the measurements which define walls 102, 104, 106, and 108, opening 110, and window 112.

In the next step 204, each transponder 61*a*, 61*b*, 61*c* or 61*d* communicates its local map model 63, 72, 84, or 100 corresponding to its surrounding physical space 62, 82 or 98, respectively, to server computer 14. In addition to the model details, information including but not limited to: physical location in the spatial environment relative to all other transponders, compass orientation and altitude (based on altimeter measurements), is also provided to the server computer 14.

Figure 5:
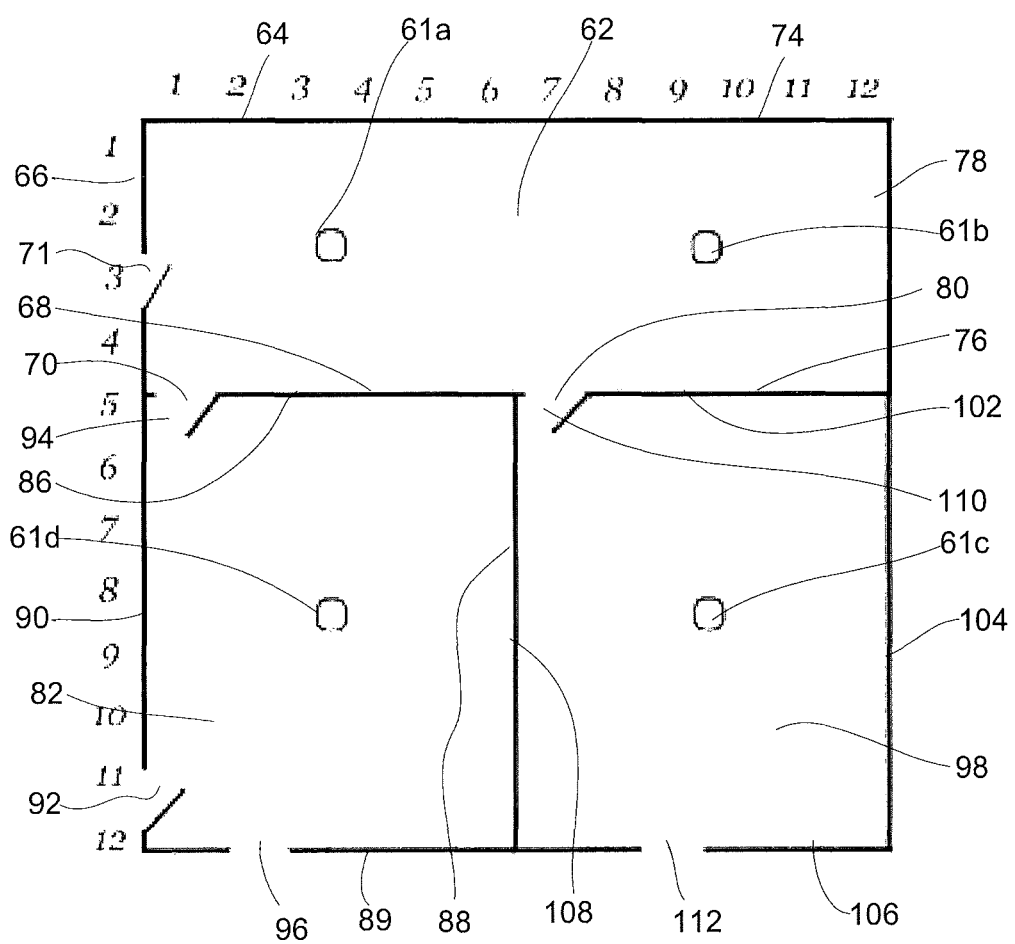
FIG. 5 shows a floor plan with transponder locations.

Once all of the data is collected at the central management unit 16, a navigation solution can be formed, which may include but is not limited to: two-dimensional position, three-dimensional position, position relative to known landmarks or map features, heading, orientations, speed, bearing, and the like. A server application executes program instructions to build a composite map of the entire space in which the system is deployed, using the determined relative positions, orientations and altitude, in step 206. The server application positions each local map model 63, 72, 84, 100 on a grid formed of a plurality of grid cells having individual coordinates. Next, each model 63, 72, 84, 100 is oriented correctly on the grid, based on the known locations of the transponders 61*a*, 61*b*, 61*c* and 61*d*, and the compass orientation indicated in the local map model 63, 72, 84, or 100. Models that are indicated to be at different altitudes are positioned onto separate grids, and are presumed to represent different levels of the same building. FIG. 5 shows an exemplary building floor plan 114 derived from local map models 63, 72, 84, and 100, in which common features, such as structures, objects, walls, openings, passageways, doorways, furniture etc. are recognized using pattern recognition algorithms and registered to avoid duplication of such features on the eventual composite floor plan 114. Accordingly, a pattern recognition module 38 having executable instructions to perform a pattern recognition process to recognize common physical attributes within said spatial environment.

As can be seen in FIG. 5, transponder 61*a* is positioned at physical location (2,3) within space 62, transponder 61*b* is positioned at physical location (2,9) within space 62, transponder 61*c* positioned at physical location (8,3) within space 82, and transponder 61*d* positioned at physical location (8,9) within space 98.

System 10 therefore minimizes the deployment effort, as it eliminates the need for manual site surveys, or complex transcription of map/floor plan images into routable formats. System 10 also facilitates self-healing of map models, as the transponders 61*a*, 61*b*, 61*c* and 61*d* constantly, or periodically monitor their spaces 62, 82 and 98 to detect any changes therewithin, and generate and upload the updated local map models to the server computer 14. Therefore, the composite map model is automatically updated to maintain the most up-to-date map, and any lag time between physical changes in a space and the updates to the digital representation of the physical space is substantially reduced. In addition, automated composition of routable floor plans of the space in which the system is installed is therefore facilitated. Each transponder 61*a*, 61*b*, 61*c* or 61*d* emits radio signals that can be interpreted by user device 22 to determine the relative position of user device 22 within the space. This positional data, in combination with the understanding of the floor plan, is used to determine turn-by-turn navigation directions to the user of the user device 22, including searching for directions.

Figure 6A:
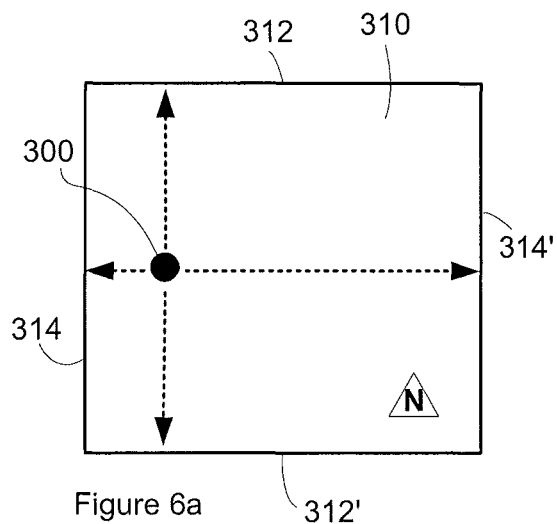
FIGS. 6a, 6b, 6c show locations of individual transponders positioned in an exemplary spatial environment.
Figure 6B:
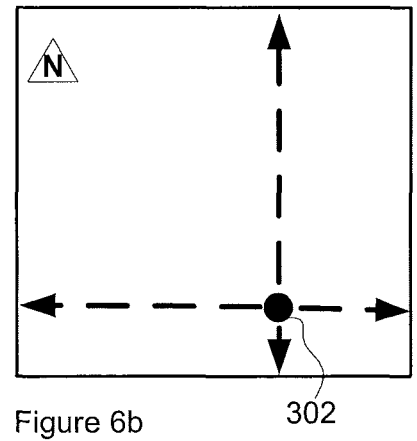
Figure 6C:
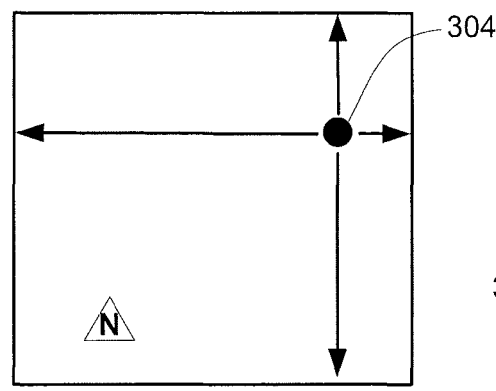

In another implementation, system 10 supports self-location of a transponder within a spatial environment. For example, once at least three transponders are powered on and setup, every subsequent transponder that is added to system 10 triangulates and/or trilaterates the signals from at least three other transponders to establish its relative physical position. Accordingly, each transponder comprises an integrated transceiver having a full radio receiver client application capable of triangulating and/or trilaterating the signal information broadcast by other transponders in the system 10 for the purpose of self-locating. In order to triangulate and/or trilaterate location based on the strength of radio signals broadcast by a set of transponders, the relative position of each of the first three transponders in the system 10 is established. FIGS. 6*a*, 6*b* and 6*c* show three transponders 300, 302, 304, similar or identical to transponders 12, 61*a*, 61*b*, 61*c* and 61*d*, positioned at locations within a spatial environment, such as a room 310 with a pair of opposing wall structures 312, 312' and 314, 314'. Advantageously, by supporting self-location of individual transponders 300, 302, 304, the need to manually establish the location of each transponder 300, 302, 304 for the purpose of enabling triangulation and/or trilateration of the radio signals by user devices 22 is substantially minimized.

Figure 7:
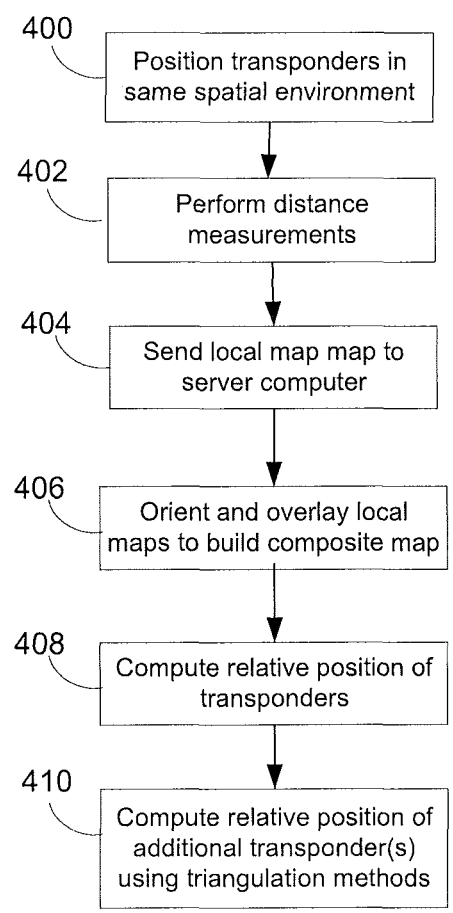
FIG. 7 shows a high level flow diagram illustrating an exemplary process steps for creating a routable map, in another embodiment.

FIG. 7 shows a high level flow diagram illustrating exemplary process steps for determining the relative position of the first three transponders 300, 302, 304 in a spatial environment 310. In step 400, all three transponders 300, 302, 304 are positioned in the same room 310, such that each transponder 300, 302, 304 can map the entire space of the room 310 individually, using the 3D spatial sensing method steps described above. Therefore, each transponder 300, 302, 304 scans the room 310 and establish a local map of the surrounding walls (as described above). This map essentially contains multiple distance measurements from the transponder 300, 302 or 304 to the walls for an entire 360 degree rotation. As shown in FIGS. 6*a*, 6*b* and 6*c*, each transponder 300, 302 or 304 is positioned in different areas of the room 310 and measures different distances to the same wall in the room 310, step 402. FIGS. 6*a*, 6*b* and 6*c* illustrate local map information for each transponder 300, 302 or 304, along with orientation information and the arrows indicating exemplary distances to each wall as measured by the transponder 300, 302 or 304.

Figure 6D:
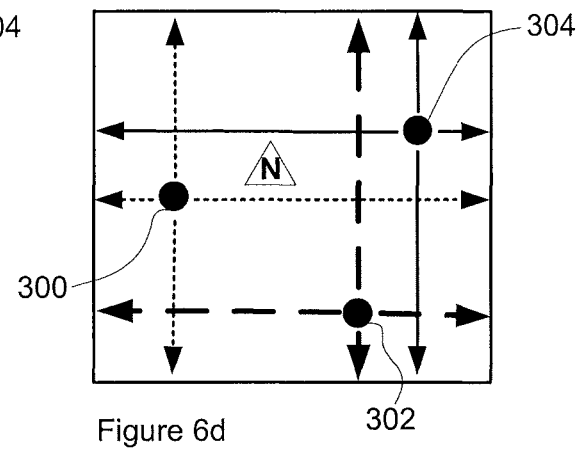
FIG. 6d shows a resulting map with the relative location of each transponder.
Figure 6E:
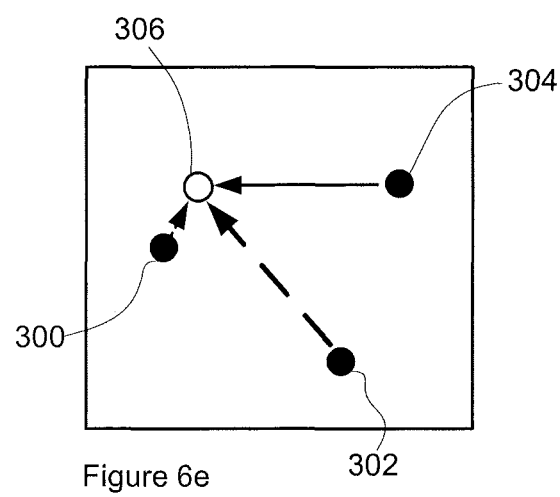
FIG. 6e shows a triangulation and/or trilateration method for determining a relative location of a transponder added to the exemplary spatial environment.

Next, each transponder 300, 302 or 304 sends its local map of the room, including orientation information from an integrated compass, to server computer 14, step 404. The server computer 14 uses the orientation information from each transponder 300, 302 or 304 to align the maps correctly and overlays them directly on top of each other to create a composite map of the same room 310 from the perspective of each transponder 300, 302 or 304, step 406. FIG. 6*d* shows the resulting map with the relative location of each transponder 300, 302, or 304 to each other. The relative location of the transponders 300, 302, 304 is subsequently computed based on the distance information contained in the map for each transponder 300, 302, 304 to the walls in the room 310, step 408. Once the relative position of the first three transponders 300, 302, 304 has been established, then traditional triangulation and/or trilateration techniques can be applied to establish the relative position of an additional transponder 306, step 410. In one example, this step comprises the steps of measuring the Wi-Fi signal strength from each of the existing transponders 300, 302, 304 to determine a distance measurement. The three measurements establish an absolute position for the newly added transponder 306 relative to the first three transponders 300, 302, 304.

In another implementation, the relative positioning of the first three transponders can be determined when they are positioned in a room such the areas that the transponders scan overlap substantially. Accordingly, a sufficient subset of the walls or interior features that each transponder can detect in the room overlaps with one or more of the other transponders. This overlap can then be used to identify common features between the individual scans and used as a basis to assemble the separate scans into a single map. The process of identifying matching overlaps is similar in concept to assembling a jigsaw puzzle, and will be referenced in subsequent paragraphs as 'the jigsaw approach' and further described below in the context of composite map generation. Essentially, each scan is positioned in all possible combinations against every other scan until matches in scanned features are found. Each possible match is given a weighting based in the quality of the match, and the highest scoring match is used. A complete map of the room is composed by matching each individual local map model with all other local map models. Then, based on the distance information contained in the map for each transponder to the walls in the room, the relative location of the transponders can be calculated.

Once the relative position of the first three transponders to each other has been established, a combination of the grid approach and jigsaw approach may be combined to establish the relative positions of all subsequent transponders. If the subsequent transponder is positioned such that its scan has overlap with previously positioned transponders, then the same approach as described above (jigsaw puzzle) for positioning the first three transponders can be used to establish its relative position.

If the subsequent transponder is not positioned such that its scan has overlap with previously positioned transponders, then triangulation techniques can be applied to establish the a general relative position of additional transponders that get added to the system to the three initial transponders. This is done by measuring the Wi-Fi signal strength from each of the existing transponders to determine a distance. The three measurements establish an absolute position for the newly added transponder relative to the first three transponders. However, due to inherent imprecision with using traditional triangulation techniques, triangulation alone is not sufficient. Therefore, triangulation is employed in conjunction with the jigsaw approach as described above in order to refine accuracy of the established position. Once the position of sufficient numbers of transponders have been generally established using the triangulation approach, some will inevitably have required overlap of their scan with the scan of transponders whose positions have been precisely determined using the 'jigsaw' approach. It is then possible to use the jigsaw approach again to refine the triangulated positions of the transponders.

Figure 8:
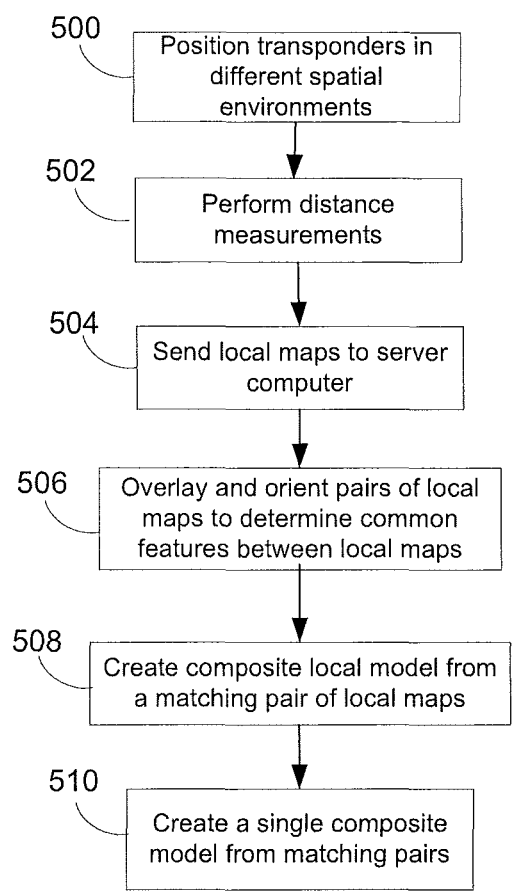
FIG. 8 shows a high level flow diagram illustrating an exemplary process steps for creating a routable map, in yet another embodiment.

FIG. 8 shows a high level flow diagram illustrating exemplary process steps for determining the relative position of the first three transponders 400, 402 and 404 in spatial environment 410, such as a room. As shown in FIG. 9a, room 410 is defined by walls 500, 502, 504, 506, 508, 510, 512, and 514. In step 500, all three transponders 400, 402 and 404 are positioned in spaced apart locations within spatial environment 410, such that the areas mapped by each transponder 400, 402 or 404 overlap substantially, as shown in FIG. 9a. Therefore, each transponder 400, 402 and 404 scans the spatial environment 410, and establishes a local map of the surrounding walls (as described above) (step 502). However, unlike in the previous example, none of these maps contain any additional information regarding relative position, orientation or altitude. FIG. 9b shows a first local map 420 corresponding to the view of the room 410 from the perspective of transponder 402, and comprises walls 500, 502, 504, 506, 510a, 512, and 514. FIG. 9c shows a second local map 422 corresponding to the view of the room 410 from the perspective of transponder 404, and comprises walls 500a, 502, 504a, 508, 510, and 512. FIG. 9d shows a third local map 424 corresponding to the view of the room 410 from the perspective of transponder 400, and comprises walls 500, 502, 504, 506, 508, 510b, and 514.

Next, in order to create a complete floor plan, each transponder 400, 402 or 404 sends its respective local map 420, 422, and 424 of the spatial environment 410 to server computer 14, in step 504. For each local map model 420, 422, or 424, every other model 420, 422, or 424 is positioned against it in every position and orientation that results in some overlap of identified features so as to compare the quality of the match of those features in the local model 420, 422, and 424 and rate 'similar-ness' (step 506). The quality of a match can be assessed in a variety of ways, not limited to: the number of distinct line segments that overlap; the number of corners that overlap; the number of gaps between line segments that overlap; the position and orientation pair that result in the best match for all possible local map model pairing is considered to be the correct relative placement of the two specific local map models. For example, looking at FIG. 10a, a pair of local map models 420 and 424 are compared in one orientation and are found to share only one common feature i.e. wall 502, and no common corners are shared. Meanwhile, in another orientation it is determined that models 420 and 424 share one common feature i.e. wall 500, and no common corners are shared, as shown in FIG. 10b. In yet another orientation it is determined that models 420 and 424 share two common features i.e. walls 500 and 514, and 1 common corner, as shown in FIG. 10c. In even yet another orientation it is determined that models 420 and 424 share 5 common features i.e. walls 500, 502, 504, 506, and 514, and 5 common corners, as shown in FIG. 10d, thus representing the best match-pair. Therefore, once the two local map models 420 and 422 have been paired, they are combined and treated as a working composite local map model 426 to be used in future pairs (step 508).

Figure 11A:
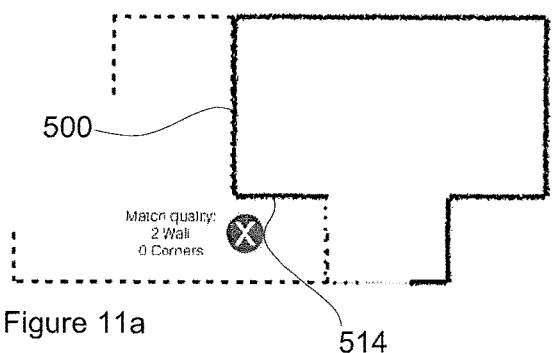
FIGS. 11a to 11d show the pairing of a local map model with the working composite map model to generate a final composite map model.
Figure 11B:
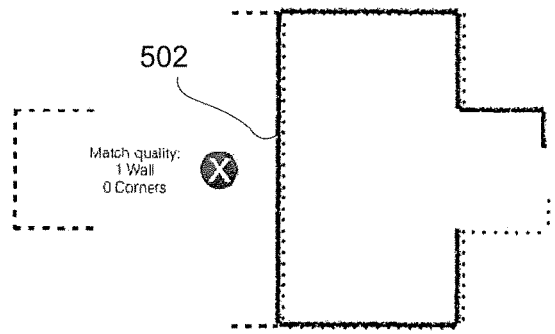
Figure 11C:
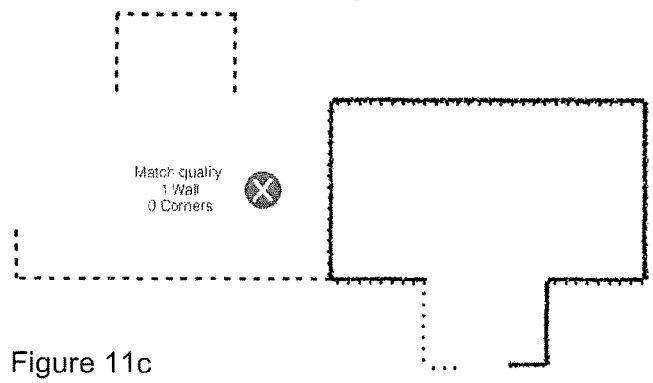
Figure 11D:
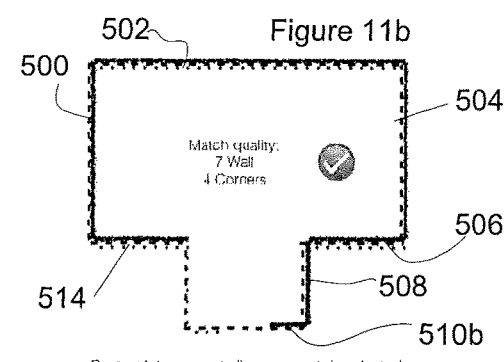

In next step 508, working composite local map model 426 and local map model 422 are compared in one orientation and are found to share only 3 common features i.e. wall 500 and 514, and no common corners are shared, as shown in FIG. 11a. Meanwhile, in another orientation it is determined that models 422 and 426 share one common feature i.e. wall 502, and no common corners are shared, as shown in FIG. 11b. In yet another orientation it is determined that models 422 and 426 share one common feature i.e. wall 500, and no common corners, as shown in FIG. 11c. In even yet another orientation it is determined that models 422 and 426 share 7 common features i.e. walls 500, 502, 504, 506, 508, 510 and 514, and 4 common corners, as shown in FIG. 11d, thus representing the best match-pair. Therefore, once the models 422 and 426 have been paired, they are combined and treated as the final composite local map model 430 (step 510).

To better illustrate the positioning and orientation approach, consider a simplified characterization of relative positioning of two local map models in terms of the hour on a clock relative to the centre of the clock face, in which a local map model positioned at 12 o'clock is positioned directly above another, while one positioned at 2 o'clock is positioned slightly above and to the right of another.

Similarly, consider a simplified characterization of orientation of a single local map model in terms of the points on a compass. A map oriented in due North orientation is 180 degrees rotated from one oriented in due South orientation. Finally, consider 2 local map models A and A' for comparison with each other using the jigsaw approach. Suppose that model A be positioned statically (i.e. at the centre of the clock face, facing due North), and model A' be positioned at 12 o'clock to model A and oriented in due North orientation. Then, to thoroughly evaluate all possible positions between model A and model A', the quality of the match is evaluated for every position on the clock and for every compass point orientation possible for A'. Therefore, for 12 o'clock, model A' is rotated to NNW orientation, and evaluated, then model A' is rotated to NW, then WNW, and so forth, until all orientations for 12 o'clock have been considered. Next, model A' is repositioned to 1 o'clock (or 12.30, depending on the accuracy needed), and the above-noted steps are repeated for every orientation. Once all positions have been considered in all orientations, the quality of the resulting matches is assessed in order to select the best match.

In another implementation, additional information, such as orientation, is sent to the computer server 14 to facilitate a more expedient pairing process using the jigsaw approach. Knowledge of the orientation of the local map models reduces the number of potential pairings that need to be examined by eliminating those that do not match the known orientation. Similarly, if even a vague relative position is known (e.g. established via triangulation), then positioning that does not match the known relative position can be eliminated from consideration.

In another implementation, the relative positioning of the first three transponders can be determined, even when each of the three transponders are positioned in different rooms. While the three transponders are not positioned within the same space, the transponders are positioned a room such the areas that transponders 400, 402 and 404 scan overlap substantially. Accordingly, some sufficient subset of the walls or interior features that each transponder can detect in the room overlaps with one or more of the other transponders. As described above, any overlap is used to identify common features between the individual scans and used, in combination with the orientation information, as a basis to assemble the separate scans into a single map using the jigsaw approach. Triangulation methods may be employed to determine the relative location of any subsequent transponders, as described above.

In yet another exemplary embodiment, location information is used for a wide variety of applications, including but not limited to turn-by-turn navigation, aggregation for the purpose of analytics and asset tracking. Furthermore, the floorplan information can be used as the basis for a variety of indoor experiences that are dependent on accurate indoor maps.

In yet another embodiment, an infrastructure for distributed computing platform for spatially aware applications is provided by system 10. In order to enable indoor navigation, pinpointing a relative location, and mapping that location to an understanding of the floor plan is performed. Each transponder emits radio signals that can be used to triangulate/and or trilaterate location relative to the positioning of the transponders. The relative location can then be mapped to a physical location within a building by applying the floor plan information. Once the transponders have been deployed throughout a building, they create an interconnected array of computing units that have the unique ability to sense the physical space around them. Such an array of computation units can be used as the infrastructure for a wide variety of applications that leverage the spatial information, such as, brick-and-mortar retail customer analytics, such as customer behavioural analytics and customer location analytics. Various actionable insights are provided via detailed visualizations and reports. Other applications include home alarm system applications and augmented reality systems.

In yet another implementation, the methods and systems of the present invention enable real time mapping and 3D imaging of dynamic spaces such as warehouses, or remote and inaccessible spaces such as municipal sewage systems, oil and gas infrastructures or refineries.

While the map modelling process is shown and described as residing on, and being executed by, transponders, other implementations may equally be utilized. As such, map modelling process may be a server-side process executed on server computer 14, a client-side process executed by one or more transponders, or a hybrid client-side/server-side process, executed in part by server computer 14 and one or more transponders.

In yet another implementation, each transponder may be powered via any one of a battery, centralized battery storage device, and a photovoltaic electric system, or any combination thereof.

In yet another implementation, the transponders are temporarily installed, or installed for a predetermined time sufficient to perform the above-noted method steps for sensing a spatial environment and generate an associated map.

In yet another implementation, sensors 41 can include accelerometers, gyroscopes, pressure sensors, magnetic field sensors, bio sensors, and the like.

In yet another implementation, cover 60 is arranged to enclose various components of the transponder 12 assembly, and may include any of: a first section and a second section that are interlocked with one another; a unitary cover; and a unitary cover with a transparent section. Alternatively, cover 60 comprises a hemispherical dome or a partial hemispherical dome.

In yet another implementation, a larger or smaller range of motion may be implemented for the sensor cradle 53 and platform 51, and may have a programmable predetermined range of motion dependent on the spatial environment to be scanned.

In yet another implementation, antenna 43 is a low profile antenna with a meander length based on the full electrical wavelength of the signal being transmitted or received. The low profile antenna includes either an open-loop structure or a closed-loop structure with a matching network, without an extendable whip antenna.

User device 22 may be a general-purpose computer system on which the turn-by-turn navigation operates. The general-purpose computer system comprises, for example, a processing unit, such as processor, system memory. The system also includes as input/output (I/O) devices coupled to the processor via an I/O controller. The input/output (I/O) devices include, for example, a keyboard, mouse, trackball, microphone, touch screen, a printing device, display screen, speaker, etc. A communications interface device provides networking capabilities using Wi-Fi, and/or other suitable network format, to enable connection to shared or remote drives, one or more networked computers, or other networked devices, via the communications network 18. The components of computer system may be coupled by an interconnection mechanism, which may include one or more buses (e.g., between components that are integrated within a same machine) and/or a network (e.g., between components that reside on separate discrete machines). The interconnection mechanism enables communications (e.g., data, instructions) to be exchanged between system components.

The processor executes sequences of instructions contained in memory, such as a machine readable medium. The machine readable medium includes any mechanism that provides (i.e., stores and/or transmits) information in a form accessible by a machine (e.g., a computer, network device, personal digital assistant, a smartphone, any device with a set of one or more processors, etc.). For example, machine readable media includes recordable/non-recordable media (e.g., read only memory (ROM); random access memory (RAM); magnetic disk storage media; optical storage media; flash memory devices; a hard disk drive, etc.), as well as electrical, optical, acoustical or other forms of propagated signals (e.g., carrier waves, infrared signals, digital signals, etc.). The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used. The operating system may be, for example, iPhone OS (e.g. iOS), Windows Mobile, Google Android, Symbian, or the like.

Server computer 14 includes a computer system with elements similar to those described above with reference to user device 22. Server computer 14 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Server computer 14 may execute a web server application, examples of which may include but are not limited to: Microsoft IIS, Novell Webserver™, or Apache® Webserver, that allows for HTTP (i.e., HyperText Transfer Protocol) access to server computer 14 via network 18 (Webserver is a trademark of Novell Corporation in the United States, other countries, or both; and Apache is a registered trademark of Apache Software Foundation in the United States, other countries, or both). Network 18 may be connected to one or more secondary networks (e.g., network 18), examples of which may include but are not limited to: a local area network; a wide area network; or an intranet, for example.

Database 20 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention. Alternatively, database 20 is communicatively coupled to server computer 14.

The user devices 22 and computer server 14 may communicate with each other using network-enabled code. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMWL), Wireless Markup Language (WML), Java™, Java™ Beans, Enterprise Java™ Beans, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The communications network 18 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A transponder for sensing a spatial environment for the purposes of creating a local map model of said spatial environment, said transponder comprising:
a microprocessor;
at least one sensor for scanning said spatial environment and acquiring sensing information about said spatial environment;
a memory having instructions executable by said microprocessor to cause the microprocessor to process said sensing information to:
determine distance measurements between said transponder and features within said spatial environment;
generate said local map model;
a communications interface module coupled to said microprocessor for enabling communication with a first computing device to send said local map model thereto and for enabling communication with a second computing device for using said local map model to navigate said spatial environment;
wherein said transponder is fixedly positioned in a known location within said spatial environment; and
wherein said at least one sensor is mounted on a movable platform that allows said at least one sensor to be positioned in a plurality of positions to capture distance measurements within said spatial environment; and
wherein said movable platform is controlled by a motor drive module comprising at least one motor for moving said platform in at least one plane.

2. The transponder of claim 1, wherein said at least one sensor comprises at least one of a sonar, laser, IR, radar and lidar, radio frequency (RF) transceiver.

3. The transponder of claim 2, wherein at least one sensor is one from a plurality of sensors in a sensor array.

4. The transponder of claim 3, wherein said sensing information is received by a sensing module coupled to said microprocessor.

5. The transponder of claim 4, wherein said communications interface comprises at least one of a wired interface, wireless interface, optical, IR interface and RF interface.

6. The transponder of claim 1, wherein said motor drive module receives control signals from said microprocessor to control said at least one motor; and
wherein said at least one motor is at least one of a tilt stepper motor for tilting a sensor cradle mounted on said platform and a pan stepper motor for swivelling said platform.

7. The transponder of claim 6, whereby a plurality of transponders are positioned within said spatial environment and each one of said plurality of transponders creates its own local map model of said spatial environment, and wherein said first computing device receives and combines said local map models from said plurality of transponders form a composite map of said spatial environment.

8. The transponder of claim 7, wherein said second computing device receives said composite map of said spatial environment to facilitate wayfinding and/or navigation within said spatial environment.

9. The transponder of claim 8, wherein said communications interface module transmits signals to said second computing device, and said second computing device receives said signals to determine relative position of said second computing device within said spatial environment.

10. The transponder of claim 9, further comprising at least one of a housing fixedly attached to a surface within said spatial environment for positioning therein and a housing removably attached to a surface within said spatial environment for positioning therein.

11. The transponder of claim 10, further comprising a pan bevel gear mounted on a platform, and a pan stepper motor for turning a pan stepper motor bevel gear with teeth for engaging teeth on said pan bevel gear; and further comprising a tilt bevel gear mounted on a sensor cradle, and a tilt stepper motor comprising a tilt stepper motor bevel gear with teeth for engaging teeth on said tilt bevel gear.

12. The transponder of claim 1, wherein said transponder is installed for a predetermined time sufficient to acquire sensing information about said spatial environment and generate said local map model.

13. The transponder of claim 1, wherein said transponder comprises at least one of an accelerometer, gyroscope, pressure sensor, magnetic field sensor, and a bio sensor.

14. The transponder of claim 1, wherein local map model is at least one of a 2-dimensional (2D) representation of said spatial environment and a 3-dimensional (3D) representation of said spatial environment.

15. The transponder of claim 1, wherein at least one of said plurality of transponders comprises a radio transceiver capable of triangulating signals broadcast by other transponders to determine its relative position within said spatial environment.

16. The transponder of claim 15, wherein said relative position is determined via triangulating signals based on the strength of radio signals broadcast by said other transponders.

17. The transponder of claim 1, wherein at least one of said plurality of transponders comprises a radio transceiver capable of trilaterating signals broadcast by other transponders to determine its relative position within said spatial environment.

18. The transponder of 18, wherein said relative position is determined via trilaterating signals based on the strength of radio signals broadcast by said other transponders.

19. The transponder of claim 1, wherein said transponder responds to any change in its location and any change within said spatial environment by automatically generating an updated local map to reflect said any change.

20. A method for generating a routable map of a spatial environment, the method comprising the steps of:
fixedly positioning a transponder in a known location within said spatial environment;
associating at least one sensor with said transponder, said at least one sensor being rotatable in at least one plane;
measuring distances within said spatial environment with said at least one sensor relative to said location; and
composing a local map model of said spatial environment based on said measurements;
wherein said at least one sensor is mounted on a movable platform that allows said at least one sensor to be positioned in a plurality of positions to capture distance measurements within said spatial environment; and
wherein said movable platform is controlled by a motor drive module comprising at least one motor for moving said platform in at least one plane.

21. The method of claim 20, wherein said at least one sensor determines positional co-ordinates, orientation and location of said transponder relative to another transponder in another location within said spatial environment.

22. The method of claim 21, comprising a further step of generating a composite map model based on said local map model of said transponder and another local map model of said another transponder.

23. The method of claim 22, comprising a further step of determining the presence of objects within said spatial environment with said at least one sensor, and recognizing said object.

24. The method of claim 23, comprising a further step of providing turn-by-turn navigation within said spatial environment.

25. The method of claim 24, wherein said turn-by-turn navigation is provided via a user device, wherein said location of said user device within said spatial environment is determined using signals received from said transponder and said another transponder, and said user device location is shown on said routable map.

26. The method of claim 20, wherein at least one of said first local map model, said second local map model and said third local map model is at least one of a 2-dimensional (2D) representation of said spatial environment; and a 3-dimensional (3D) representation of said spatial environment.

27. The method of claim 20, wherein each of said transponders responds to any change in its location within said spatial environment by automatically generating an updated local map to reflect said any change.

28. The method of claim 27, wherein said composite map model comprises said updated local map.

29. The method of claim 20, wherein each of said transponders responds to any change within said spatial environment by automatically generating an updated local map to reflect said any change.

30. The method of claim 20, wherein said any change within said spatial environment is due at least one of a renovation, temporary deployment of an object or a structure.

31. A transponder for sensing a spatial environment for the purposes of creating a local map model of said spatial environment, said transponder comprising:
 a microprocessor;
 at least one sensor for scanning said spatial environment and acquiring sensing information about said spatial environment;
 a memory having instructions executable by said microprocessor to cause the microprocessor to process said sensing information to:
  determine distance measurements between said transponder and features within said spatial environment;
  and generate said local map model;
 a communications interface module coupled to said microprocessor for enabling communication with a first computing device to send said local map model thereto and for enabling communication with a second computing device for using said local map model to navigate said spatial environment;
 wherein said transponder is fixedly positioned in a known location within said spatial environment;
 wherein said at least one sensor is mounted on a movable platform that allows said at least one sensor to be positioned in a plurality of positions to capture distance measurements within said spatial environment; and
 wherein said movable platform is controlled by a motor drive module comprising at least one motor for moving said platform in at least one plane; and further comprising a pan bevel gear mounted on a platform, and a pan stepper motor for turning a pan stepper motor bevel gear with teeth for engaging teeth on said pan bevel gear; and further comprising a tilt bevel gear mounted on a sensor cradle, and a tilt stepper motor comprising a tilt stepper motor bevel gear with teeth for engaging teeth on said tilt bevel gear.

\* \* \* \* \*